United States Patent Office 3,589,992
Patented June 29, 1971

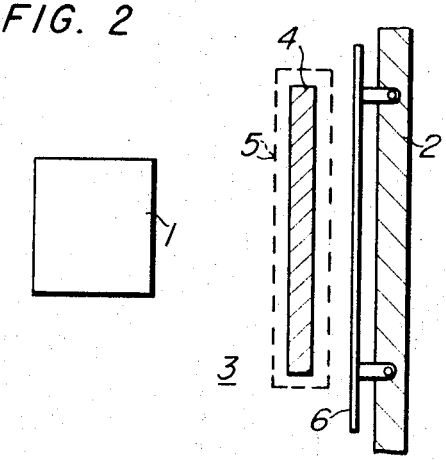
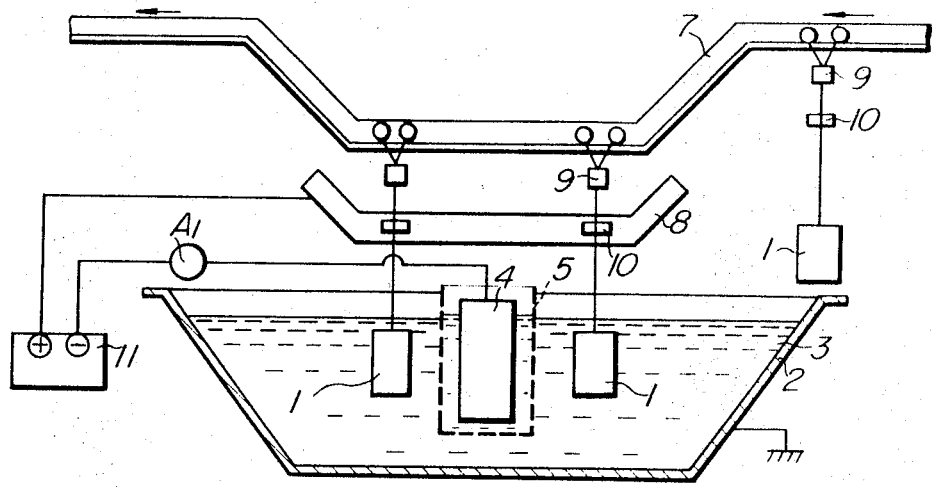

3,589,992
METHOD OF ELECTRODEPOSITION OF WATER-THINNABLE PAINTS
Hitoshi Kawai, Neyagawa-shi, Makoto Mikawa, Suita-shi, Yoshiaki Oyabu, Kyoto, and Yoshitaka Atarashiya and Masanori Matsumoto, Aki-gun, Hiroshima-ken, Japan, assignors to Nippon Paint Co., Ltd., Osaka, and Toyo Kogyo Company Limited, Aki-gun, Hiroshima-ken, Japan
Filed Sept. 3, 1968, Ser. No. 757,007
Claims priority, application Japan, Sept. 4, 1967, 42/56,448
Int. Cl. B01k 5/00
U.S. Cl. 204—181    4 Claims

---

ABSTRACT OF THE DISCLOSURE

A process for the electrodeposition coating which comprises immersing an article to be coated (which is an anode) and a cathode surrounded by diaphragms in an electroconductive electrodeposition cell containing a water-thinnable paint, and passing an electric current between said article and the cathode to form a coating on the article. An electroconductive metal plate is inserted between the diaphragms surrounding the cathode and the wall of the cell nearest to this cathode, said plate being connected to the wall through an electroconductive means and being substitutable, whereby a metal ion is prevented from being dissolved into the paint from said cell wall.

---

Figure 1:
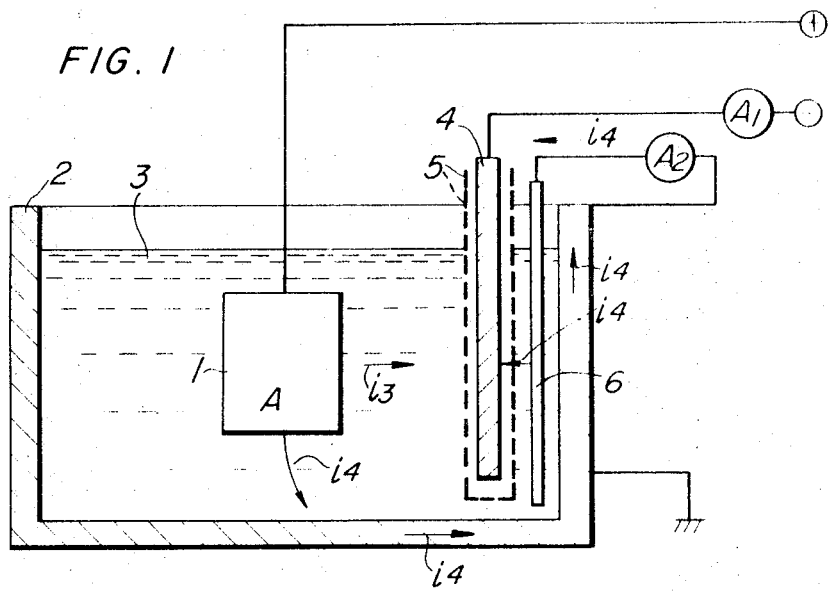

The present invention relates to an improvement in the method of electrodeposition of a paint, and more particularly, it relates to a method for the electrodeposition of a paint in which a metal ion is prevented from being dissociated during electrodeposition coating from the wall of an electrodeposition cell containing a water-thinnable paint for electrodeposition composed of film-forming components comprising a pigment and a vehicle, and an alkaline material for stabilizing said components.

In general, an electrodeposition coating method comprises immersing an anode which is an article to be coated and a cathode in said paint and passing an electric current therebetween to deposit a negatively charged pigment and vehicle on the anode whereby the article is coated with the paint. However, when an electrodeposition cell formed of an electroconductive material is used as the cell containing the paint, the electric current applied to the article flows directly to the cathode through the paint present between the article and the cathode, and simultaneously flows through the paint present between the article and the cell, the cell and the paint present between the cell and the cathode to the cathode. Therefore, a metal ion is dissociated from the wall of the cell nearest to the cathode by electrolysis, whereby the cell becomes eroded when used for a long time.

In the present invention, an electroconductive metal plate is inserted between the cell and the cathode, and electrically connected to the cell to remove the above-mentioned disadvantage, whereby a metal ion is dissociated from said metal plate only to prevent a metal ion from being dissociated from the wall of the cell nearest to the cathode.

The dissociated ion is attracted by the cathode through the diaphragm into the cathode compartment formed by diaphragms. Therefore, the electrodeposition coating properties of the paint are not deteriorated.

When an article desired to be coated is continuously coated according to the above method by way of a conveyor type procedure or an intermittent conveyor type procedure, the negatively charged film-forming components comprising pigment and vehicle are carried away, as deposited on the article, from the paint system. However, cations which cause the development of alkalinity are not removed from the system, and therefore alkaline components are accumulated in the paint to increase the pH thereof, whereby the paint is deteriorated in electrodeposition properties such as the weight of electrodeposited film per unit electricity, the throwing power, and the appearance of the resulting film. In order to apply the above method on commercial scale, therefore, it is necessary to solve the problem of said accumulation of cations in the electrodeposition cell. There are various measures for solving said problem, including a process using a cation exchange resin, a process using an ion dialysis apparatus, a process of controlling the pH of the paint by replenishing the cell with a paint that is lower in alkaline components than the original paint, and a process of controlling the pH by use of a diaphragm (hereinafter referred to as "the diaphragm method"). The diaphragm method is a method in which a paint solution is separated from a catholyte within a cathode compartment formed by covering the cathode with the diaphragm comprising, for example, a vegetable textile, fabric, a cation exchange resin film or an inorganic material, which permits the passing of cations, but prevents the passing of anions. That is, when an anode which is a material to be coated is immersed in a paint solution and an electric current is applied, negatively charged, film-forming components composed of vehicle and pigment deposit on the anode. At the same time, cations liberated from ammonium hydroxide, organic amine, sodium hydroxide or potassium hydroxide which has been used for stabilizing the paint and miscellaneous cations originally present in the paint, are concentrated through the diaphragm into the cathode compartment. As the result, the ratio between the negative charged film-forming components composed of pigment and vehicle, which are contained in the electrodeposition paint, and alkaline cations is always maintained constant. Accordingly, the continuous practice of electrodeposition of paint on commercial scale of supplementing the pigment and vehicle in the paint which have been decreased in amounts due to the electrodeposition coating, and removing, from the cathode compartment, alkaline components which have been accumulated in said compartment, thus keeping constant the pH of the paint in the electrodeposition cell. Thus, management of paint in the bath is markedly easy. The present invention enables the electrodeposition coating to be more efficiently effected by being used together with such a diaphragm process.

In the accompanying drawings, FIG. 1 is a rough sketch for illustrating the principle of the present invention; FIG. 2 is a plane view of said sketches; and FIG. 3 is a rough sketch of the apparatus employed in Example 2 shown later.

In FIGS. 1, 2 and 3, 1 is an anode which is an article to be coated. The anode is connected to the positive pole ⊕ of a direct current source and is continuously coated according to a conveyor type procedure or an intermittent conveyor type procedure. 2 is an electroconductive electrodeposition cell and is filled with an electrodeposition paint 3. 5 shows diaphragm which surrounds a cathode 4 connected through an ammeter $A_1$ to the negative pole ⊖ of the direct current source, and form a cathode compartment. A plurality of such cathode compartment can be arranged near the cell walls depending on the size of the electrodeposition paint cell.

When electrodeposition is effected by use of such an apparatus as above, the direct current flows, at the surfaces of article to be coated which are close to the cathode compartment, towards the cathode compartment, as shown by $i_3$ in FIG. 1. However, at the surfaces thereof close to the electrodeposition cell, the electric current flows toward the cathode compartments through the electroconductive cell, as shown by $i_4$ in FIG. 1.

This method has markedly prominent merits over a conventional process, in which the diaphragm method is carried out by use of an electrodeposition paint cell lined with an electric insulator such as a paint.

The first of said merits is that according to this method, the costs for lining the electrodeposition cell can be saved.

The second is that negative diaphragms are used for two sides of the cathode compartment, i.e. a side facing to the electrodeposition cell wall and a side facing the interior of the cell. As the inside walls of the cell can be used as the cathode, the number of cathode compartments can be smaller with resultant economy, than in the case where the cell is lined with and, at the same time, the management of catholyte is easier. The third is that the electrodeposition cell itself acts as the cathode, as has been explained with reference to FIG. 1, and therefore the electrodeposition of a portion (A) of article to be coated which is remote from the cathode compartment is easier which is a great advantage in obtaining a uniform film.

The characteristic of the present invention is characterized in that an electroconductive metal plate is inserted between the electrodeposition cell and the cathode compartment, said metal plate being in contact and connected to the electrodeposition cell, thereby preventing electro-dissolution of metal ions from the electrodeposition cell. Heretofore, when the electrodeposition coating is effected, an electric current flows in the directions of $i_4$ as shown in FIG. 1. Accordingly, the electro-dissolution of metal from the electrodeposition cell takes place, at portions where the electric current flows, and the cell is electrolytically corroded over a long period of time. The present invention prevents such electrolytical corrosion of electrodeposition cell. That is, according to the above-mentioned method of the present invention, a replaceable metal plate 6 is inserted between the electrodeposition cell and the cathode compartment, as shown in FIGS. 1 and 2, and a part of the metal plate is connected with a leading wire to the electrodeposition cell 2. When the metal plate is inserted in said state, the electric current $i_4$, which flows from the electrodeposition cell to the cathode compartment, does not flow directly from the paint cell but flows from the metal plate 6, and therefore no electrolytical corrosion of the electrodeposition cell can take place. If the metal plate 6 has been consumed due to the use thereof for a long period of time, it may be replaced with a new metal plate to prevent the damage of the electrodeposition cell.

The following examples illustrate the present invention.

EXAMPLE 1

A cathode compartment was provided in an electrodeposition cell, as shown in FIG. 1, and electro-coating was effected. The cell 2 was an iron vessel of 1 m.³ in volume, and was charged with an electrodeposition paint having the following composition:

Composition of electrodeposition paint (shown by weight percent):

| | |
|---|---|
| Red oxide | 5.0 |
| Aqueous phenol-modified alkyd resin solution (50%) (Acid value: 50, stabilized with triethylamine) | 27.0 |
| Ethyleneglycolmonoethylether | 3.7 |
| Water | 64.0 |

As the negative diaphragms 5, bag shaped hemp cloths ("Shachi No. 1" produced by Teikoku Sen-i K. K.) having a size of 30 cm. x 120 cm. was used. Into the cathode compartment, an iron plate of 0.5 mm. in thickness and 15 cm. x 100 cm. in size was inserted to be used as the cathode 4. The cathode compartment was charged with a catholyte of a 0.01% aqueous amine solution. As the metal plate 6, an iron plate of 40 cm. x 110 cm. was used, and the plate was connected through ammeter $A_2$ to the paint cell. Using the above-mentioned system, a wheel 1 (a part of wheel automobile) having a surface area of about 0.4 m.² was immersed in the center of the cell, and electro coating was effected for 2 minutes with a constant current value of 6 amp. (indication of ammeter $A_1$). In this case, the indication of ammeter $A_2$ was about 3A. The film thickness was 20μ on both the cathode compartment side and the opposite side. From the fact that the ammeter $A_2$ indicated a current value of about 3 amp., it is understood that the current $i_4$ flowed between the cathode compartment and the paint cell. In view of the above and the fact that both sides of the wheel were uniformly coated, it is clear that the electrodeposition cell acted as the cathode.

For comparison, the wheel was subjected to electrodeposition coating under the above conditions, using a lined electrodeposition cell, whereby a difference in thickness was observed between the two sides of the coated wheel. That is, the film thickness on the cathode compartment side was 20μ, whereas that on the opposite side was 10μ.

From the above results, it is evident that the method of the present invention is a useful diaphragm method. Further, from the fact that the electric current $i_4$ flows from the metal plate 6 to the cathode compartment, it is clear that said metal plate is useful for the prevention of electro-dissolution of the electrodeposition cell itself.

EXAMPLE 2

Into a ship-shaped electrodeposition cell (volume: 3.5 tons), as shown in FIG. 3, which had a width of 100 cm., a depth of 110 cm. a top length of 300 cm. and a bottom length of 185 cm., was charged with a paint having the following composition:

| | |
|---|---|
| Red oxide | 2.1 |
| Carbon black | 0.4 |
| Aqueous alkyd resin solution (50%) (Acid value: 95, stabilized and diethylamine) | 15.0 |
| Ethyleneglycolmonoethylether | 2.0 |
| Water | 80.5 |

Adjacent to two inner walls of the cell were arranged six of the cathode compartments employed in Example 1, three compartments on each side. Using the thus prepared cell, 1000 wheels having a surface area of about 0.4 m.² were subjected to electro-coating in the conveyor type pocedure. In FIG. 3, 1 shows the wheels to be coated, 2 is an electroconductive cell which is earthed, 7 is a conventional conveyor which suspends, through insulators 9, articles to be coated, and 8 is a positively charged bus bar which is connected to brushes 10 to give a positive charge to the article to be coated. As the result of electro-coating, the amine concentration in the catholyte became 0.05%, but the pH of the paint in the cell did not change and remained maintained at 7.7. This signifies the fact that the amine in the paint was transferred into the cathode compartment.

From the above results, it is evident that according to the present method, electrodeposition coating can be effected on commercial scale.

40 cm. x 110 cm. iron plates were placed between the cathode compartments and the electrodeposition cell and the plates were connected with the cell by lead wire. The same coating as above was carried out and the same result was obtained.

EXAMPLE 3

Into a 4 l. stainless steel vessel was charged an electrodeposition paint having the same composition as in Example 2. In the vessel, a box type cathode compartment having a width of 5 cm., a length of 20 cm., and a thickness of 1 cm., which had been prepared by use of "Selemion" (a cation exchanged resin diaphragm produced by Mitsubishi Kasei K. K.), was disposed along the wall of the vessel. Into the cathode compartment, an iron plate to be used as cathode was inserted and an aqueous electroconductive solution was introduced. Using the above system, an iron plate as anode having a width of 5 cm. and a length of 15 cm. was immersed in the paint in parallel to the cathode compartment and was subjected to electrodeposition coating by applying for 2 minutes a potential difference of 100 volts between the two electrodes. Then, the coated material was taken out and was water-washed and dried. In this case, both a film electrodeposited onto the iron plate surface facing the cathode compartment and another deposited onto the opposite side had a thickness of $20\mu$, and no difference in thickness was observed therebetween. Further, 50 iron sheets were continuously subjected to electrocoating under the same conditions as above, and check of the pH of the paint showed no variation from an initial value of 7.6.

A 6 cm. x 15 cm. stainless plate was placed between the cathode compartment and the electrodeposition cell and was connected with the cell by lead wire. The same coating as above was effected with the same result.

EXAMPLE 4 nIto an iron,cylindrical vessel having a diameter of 70 cm. and a height of 50 cm., the interior surface of which had not been insulated, was charged with an electrodeposition paint having the following composition:

| | |
|---|---|
| Iron oxide | 3.0 |
| Amine neutralizer of maleic acid-modified linseed oil resin | 7.0 |
| Dispersing agent | 0.01 |
| Water | 90.0 |

A porous porcelain cup of 10 cm. in diameter and 50 cm. in height was disposed, as a cathode compartment, at a position adjacent to an inner surface of the vessel. Into the porous porcelain cup, an iron plate having a width of 5 cm. and a length of 60 cm. was inserted as a cathode. As a catholyte, an aqueous electroconductive solution was used. As an anode, i.e. an article to be coated, an iron plate having a length of 40 cm. and a width of 20 cm. was used. Between the two electrodes, an electric current of 150 v. was applied, and electrodeposition coating was effected for 3 minutes. Thereafter, the coated iron plate was taken out and was water-washed and dried. Both of the films electrodeposited onto two sides of the iron plate had a thickness of $25\mu$, and no difference in thickness was observed therebetween.

A 15 cm. x 60 cm. iron plate was placed between the cathode compartment and the electrodeposition cell and the plate was connected with the cell by lead wire. The same coating as above was conducted with the same result.

What is claimed is:

1. In the method for the elecrodeposition of a film of vehicle and pigment on an anode where the electrodeposition coating is conducted in a bath of an aqueous coating solution consisting of a water-thinnable vehicle and a pigment, both having negative charge, and alkaline cations for stabilizing the vehicle and pigment dispersed in an aqueous medium, an improvement in which the interior surface of the electrodeposition cell is maintained electroconductive; and electric current is allowed to flow between the cathode and the anode which have been inserted into the cell; negative diaphragms are used for at least a pair of sides of the cathode compartment which sides are faced to each other, one of said sides facing the cell wall; and an electroconductive metal plate is inserted between the cathode compartment and the cell wall, said metal plate and cell wall being electrically connected to each other by means of an electroconductive solid material.

2. A method according to claim 1, wherein said negative diaphragms are vegetable textile fabrics.

3. A method according to claim 1, wherein said negative diaphragms are cation exchanged resin films.

4. A method according to claim 1, wherein said negative diaphragm is porous porcelain.

References Cited

UNITED STATES PATENTS

| 3,230,162 | 1/1966 | Gilchrist | 204—301X |
| 3,496,083 | 2/1970 | Kawai et al. | 204—301X |

FOREIGN PATENTS

| 743,078 | 9/1966 | Canada. | |

DANIEL E. WYMAN, Primary Examiner

W. H. CANNON, Assistant Examiner